US012452676B2

(12) United States Patent
Weber et al.

(10) Patent No.: US 12,452,676 B2
(45) Date of Patent: *Oct. 21, 2025

(54) BLUETOOTH LOW ENERGY (BLE) ADVERTISING PACKET SECURITY

(71) Applicant: Itron, Inc., Liberty Lake, WA (US)

(72) Inventors: Isaiah Michael Weber, Spokane, WA (US); Bret Gregory Holmdahl, Greenacres, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,139

(22) Filed: Dec. 4, 2023

(65) Prior Publication Data

US 2024/0155348 A1 May 9, 2024

Related U.S. Application Data

(63) Continuation of application No. 17/349,781, filed on Jun. 16, 2021, now Pat. No. 11,849,327.

(51) Int. Cl.
*H04L 9/06* (2006.01)
*H04W 4/23* (2018.01)
(Continued)

(52) U.S. Cl.
CPC ........... *H04W 12/50* (2021.01); *H04L 9/0643* (2013.01); *H04W 4/23* (2018.02); *H04W 4/80* (2018.02);
(Continued)

(58) Field of Classification Search
CPC ... H04W 12/50; H04W 12/03; H04W 12/041; H04W 12/06; H04W 12/106;
(Continued)

(56) References Cited

U.S. PATENT DOCUMENTS 9,980,140 B1 5/2018 Spencer et al.
2018/0326947 A1 11/2018 Oesterling
(Continued)

FOREIGN PATENT DOCUMENTS

EP 3410410 A1 * 12/2018 ......... G06Q 20/3278
EP 3410410 1/2021

OTHER PUBLICATIONS

The Canadian Office Action mailed May 10, 2023 for Canadian patent application No. 3,154,336, a foreign counterpart of U.S. Appl. No. 17/349,781, 5 pages.
Office Action for U.S. Appl. No. 17/349,781, mailed on Nov. 30, 2022, Weber, "Bluetooth Low Energy (BLE) Advertising Packet Security", 16 Pages.
(Continued)

*Primary Examiner* — Khoi V Le
(74) *Attorney, Agent, or Firm* — Lee & Hayes, P.C.

(57) ABSTRACT

A metrology device may include a processor and a non-transitory computer-readable media storing instructions that, when executed by the processor, cause the processor to perform operations. The operations may include generating a challenge message, the challenge message including a challenge; issuing the challenge message in a scannable undirected advertising message; receiving from the field tool a response solution to the challenge message, the response solution being calculated based at least in part on the challenge and a challenge key associated with the challenge, and verifying the response solution based at least in part on a secure hash algorithm (SHA). The challenge key may include a fixed value specific to a manufacturer of the metrology device and known to the field tool and the metrology device.

25 Claims, 10 Drawing Sheets

(51) Int. Cl.
*H04W 4/80* (2018.01)
*H04W 12/03* (2021.01)
*H04W 12/041* (2021.01)
*H04W 12/06* (2021.01)
*H04W 12/106* (2021.01)
*H04W 12/50* (2021.01)

(52) U.S. Cl.
CPC ......... *H04W 12/03* (2021.01); *H04W 12/041* (2021.01); *H04W 12/06* (2013.01); *H04W 12/106* (2021.01)

(58) Field of Classification Search
CPC ..... H04W 12/08; H04W 12/108; H04W 4/23; H04W 4/80; H04L 9/0643; H04L 9/3242; H04L 9/40; H04L 9/3271; H04L 63/101; H04L 2209/805
See application file for complete search history.

(56) References Cited

U.S. PATENT DOCUMENTS

| | | | |
|---|---|---|---|
| 2020/0178080 A1* | 6/2020 | Yasaki | H04L 9/0822 |
| 2022/0029994 A1* | 1/2022 | Choyi | H04L 63/0892 |
| 2022/0360453 A1* | 11/2022 | Sun | H04W 4/38 |
| 2022/0408266 A1 | 12/2022 | Weber | |

OTHER PUBLICATIONS

Afaneh, "How Bluetooth Low Energy Works: Advertisements (Part 1)", retrieved on Sep. 12, 2024 at <<https://novelbits.io/bluetooth-low-energy-advertisements-part-1/>>, NovelBits, Apr. 21, 2020, pp. 1-12.

Examination Report for Canadian Application No. 3,154,336, Dated Sep. 12, 2024, 4 pages.

Examination Report for Australian Application No. 2022202755, Dated Nov. 28, 2024, 4 pages.

* cited by examiner

900

```
┌─────────────────────┐
│ WITH A BPD AND OVER │
│   A BLE NETWORK,    │
│     GENERATE A      │
│  CHALLENGE MESSAGE, │
│    THE CHALLENGE    │
│  MESSAGE INCLUDING A│
│      CHALLENGE      │
│         902         │
└─────────────────────┘
           │
           ▼
┌─────────────────────┐
│ ISSUE THE CHALLENGE │
│     MESSAGE IN A    │
│      SCANNABLE      │
│      UNDIRECTED     │
│ ADVERTISING MESSAGE │
│         904         │
└─────────────────────┘
           │
           ▼
┌─────────────────────┐
│ RECEIVE FROM A FIELD│
│  TOOL A RESPONSE    │
│   SOLUTION TO THE   │
│ CHALLENGE MESSAGE,  │
│    THE RESPONSE     │
│   SOLUTION BEING    │
│ CALCULATED VIA AN   │
│         SHA         │
│         906         │
└─────────────────────┘
           │
           ▼
┌─────────────────────┐
│    VERIFYING THE    │
│  RESPONSE SOLUTION  │
│    VIA THE SHA      │
│         908         │
└─────────────────────┘
```

FIG. 9

BLUETOOTH LOW ENERGY (BLE) ADVERTISING PACKET SECURITY

RELATED MATTERS

This application is a continuation of and claims priority to U.S. patent application Ser. No. 17/349,781, filed Jun. 16, 2021, titled "Bluetooth Low Energy (BLE) Advertising Packet Security," the entirety of which is incorporated herein by reference.

BACKGROUND

Network communications allow a plurality of computing devices to communicate with one another. One form of communication standard includes the Bluetooth® wireless communication standard developed by the Bluetooth Special Interest Group (SIG) including the Bluetooth low energy (BLE). The Bluetooth communications standard provides for the exchange of data between computing devices over relatively shorter distances compared to other communication standards using ultra-high frequency (UHF) radio waves over, for example, industrial, scientific and medical (ISM) bands including 2.402 gigahertz (GHz) and 2.480 GHz, and may be carried over, for example, a personal area network (PAN).

Security between two computing devices utilizing Bluetooth® communications technologies may be enforced when the two devices are being paired. However, this pairing process may create a situation where one or more pairing devices are vulnerable to security breaches. For example, during a pairing process, a third party, unauthorized device may attempt to pair with one or both of the authorized devices by compromising a pre-pairing process wherein two Bluetooth- and/or BLE-enabled devices are exchanging advertising messages, challenges, and challenge responses. Thus, even though pairing involves key establishment and, optionally, device authentication, prior to pairing, the connecting devices perform a series of discovery, scanning, and connecting processes that may be relatively less secure than pairing processes that occur thereafter or may be entirely unsecure.

Further, in instances where one or more of the authorized devices are battery-powered or otherwise do not have access to a consistent or non-replenishable power supply, a third party, unauthorized device may perform a number of attempts to connect to the authorized devices and drain power from the authorized battery-powered devices. This may create a situation where the third party, unauthorized device may perform, either unintentionally or intentionally, a denial-of-service attack (DoS attack) on the authorized devices in which the authorized devices are rendered unavailable to its intended users or as a functioning device by temporarily or indefinitely disrupting services of a host device connected to the authorized devices. In some situations, network security and the battery life of battery-powered computing devices may be compromised. This may arise, for example, within an Internet-of-Things (IoT) network including a number of battery-powered computing devices that communicate via a Bluetooth®.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 9 illustrates a flow diagram of an example method of securing an advertising packet in a BLE network from the perspective of the BPD, according to an example of the principles described herein.

DESCRIPTION OF EXAMPLES

Figure 1:
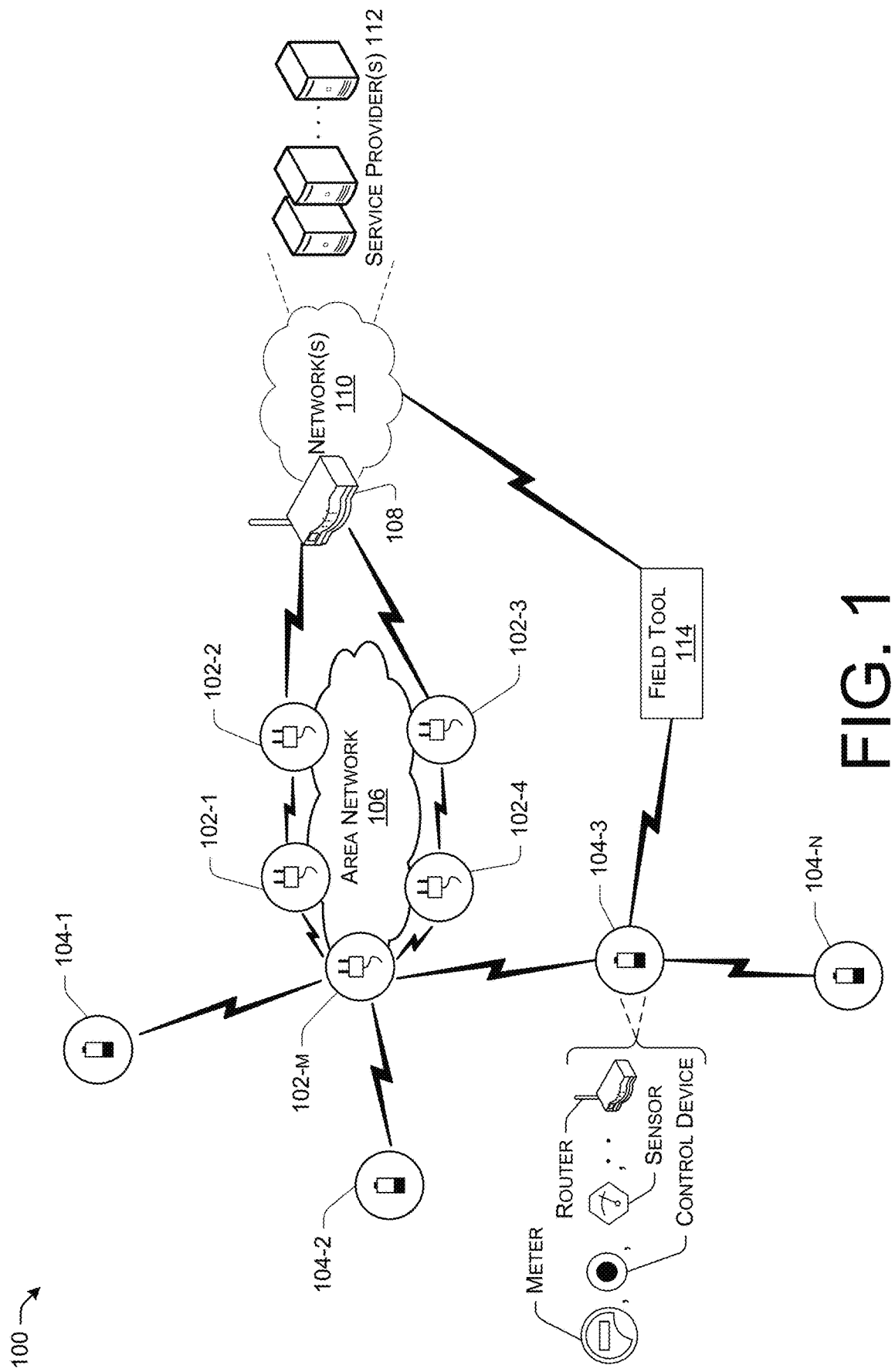
FIG. 1 illustrates a system-architecture diagram including a field tool, according to an example of the principles described herein.

The present disclosure relates generally to network security. In some examples, the present disclosure relates to systems and methods for securing connection to a device via Bluetooth® by restricting access in an advertising state of the device.

Many services offered over Bluetooth® may expose private data or let a connecting party control the Bluetooth- and/or BLE-enabled device. Security reasons make it necessary to recognize specific devices, and thus enable control over which devices can connect to a given Bluetooth- and/or BLE-enabled device. At the same time, it is useful for Bluetooth- and/or BLE-enabled device to be able to establish a connection without user intervention such as when the device comes in range. To resolve this conflict, Bluetooth® uses a process called bonding, and a bond is generated through a process called pairing. The pairing process may be triggered by a specific request from a user to generate a bond (e.g., the user explicitly requests to "Add a Bluetooth® device"), or may be triggered automatically when connecting to a service where, for the first time, the identity of a device is required for security purposes. These two cases are referred to as dedicated bonding and general bonding, respectively. Pairing may include some level of user interaction to confirm the identity of the connecting devices. When pairing completes, a bond forms between the two devices, enabling those two devices to connect in the future without repeating the pairing process to confirm device identities. When desired, a user may remove the bonding relationship.

As mentioned above, security issues may arise during pre-pairing process(es) wherein two Bluetooth- and/or BLE-enabled devices are exchanging advertising messages, challenges, and challenge responses. For example, in BLE applications, security may be enforced when the Bluetooth- and/or BLE-enabled devices begin a pairing process. During this process, another computing device may attempt to connect to a battery-powered device (BPD) within the Bluetooth® network leaving the BPD susceptible to both security breaches and/or draining of its battery power. This may be especially significant where the battery of the BPD is not easily or readily replaced and an owner or manufacturer of the BPD desires for the battery to last for years (e.g., 20 years or more in some instances) during the service life of the BPD. Irrespective of whether a computing device is being operated intentionally (e.g., nefariously) or unintentionally (e.g., accidentally requesting connection to the BPD via broadcast messaging), the potential for the computing device to compromise the BPD and the associated network(s) to which the BPD is communicatively coupled and/or drain the battery of the BPD may be of great concern.

Thus, the present systems and methods seek to eliminate such potential for intentional or unintentional breaches in security to the BPD and associated network(s) and data. The present systems and methods work outside security process(es) and prevent nefarious and inadvertent abuse of the system. Further, battery life of Bluetooth- and/or BLE-enabled devices are conserved via application of the present systems and methods. Still further, the present systems and methods reduce or prevent a return merchandise authorization (RMA) process where the Bluetooth- and/or BLE-enabled device may be returned to the manufacturer in instances where the Bluetooth- and/or BLE-enabled device or one of its constituent parts (e.g., a battery) fails. RMA is a process performed prior to returning a product to a manufacturer in order to receive a refund, a replacement of the Bluetooth- and/or BLE-enabled device, or a repair of the Bluetooth- and/or BLE-enabled device. During this process, the Bluetooth- and/or BLE-enabled device may suffer from battery power loss via the intentional or unintentional connection of devices to the Bluetooth- and/or BLE-enabled device, and the owner of the device may request a vendor or manufacturer to provide a refund for the device, or replacement or repair the device. The present systems and methods prevent RMA instances caused by intentional or inadvertent premature draining of a battery of Bluetooth- and/or BLE-enabled devices. The present systems and methods allow for this prevention of RMA and/or reduces a likelihood of battery usage due to intentional or inadvertent BLE connections while still existing within and providing communication and connection via a BLE protocol.

Further, in some BLE security systems, an external button or screen may be provided that allows a user to be able to physically interact with the Bluetooth- and/or BLE-enabled device. However, provision of such user-interactive components may create a separate security issue, may increase a cost of manufacturing of the Bluetooth- and/or BLE-enabled device, and/or may increase a power consumption of the device.

In conventional systems, during connection to a Bluetooth- and/or BLE-enabled device, a number of symmetric keys may be used during a pairing process. However, the pre-pairing processes including advertising, scanning, and connection establishment may be subjected to the security threats described above. Thus, the present systems and methods use a specific key generation algorithm and/or specific fixed values within a challenge sent via a scannable undirected advertising message.

The present systems and methods are described herein in connection with dispersed devices such as utility meters. Utility meters such as electric, water and gas meters have evolved from isolated devices that simply measure utility consumption and display a consumption reading to "smart meters" that are connected devices capable of reporting resource consumption readings automatically over a utility communication network. Some meters, such as electric meters, are powered by alternating current electricity service ("mains power") from the electricity grid. Other devices, such as many water and gas meters, are battery-powered devices (BPDs). In many cases, such BPDs are expected to operate for extended periods of time (e.g., twenty years or more in some cases) without being recharged.

The capabilities of smart meters are continuously growing. Many of the added capabilities of smart meters come with increased energy demands on the meter. However, battery technologies have not kept pace with the increased energy demands. For this reason, battery-powered smart meters have not been able to adopt many of the new capabilities that have been possible for mains powered devices because doing so would shorten their battery life. Consequently, battery-powered smart meters have had more limited functionality than their mains powered counterparts and have been unable to join certain types of communication networks. Other battery-powered devices have faced similar challenges of increasing functionality and communication ability without sacrificing battery life. The present systems and methods seek to reduce battery consumption during pre-pairing and pairing methods between BLE enabled devices, such as utility meters and field tools. The energy saving methods and systems described herein limit the number of pairing attempts including posting advertisements, scanning, and/or connecting in order to save battery power of a battery-powered device.

Although the present systems and methods are described herein in connection with utility meters, the present systems and methods may also apply to any number of distributed battery-powered devices in any context and/or environment.

Overview

In the examples described herein, the present systems and methods use a specific key generation algorithm and specific fixed values within a challenge sent via a scannable undirected advertising message. The present systems and methods provide security to advertising packets and reduce or eliminate intentional or unintentional access by a third party, unauthorized device.

Examples described herein provide a non-transitory computer-readable medium storing instructions that, when executed, cause a processor to perform operations, including receiving at a field tool, a challenge message from an advertising device via a Bluetooth low-energy (BLE) advertisement message. The challenge message includes a challenge key. The operations may further include calculating, based at least in part on the challenge key and a secure hash algorithm (SHA), a response solution. The operations further include sending the response solution to the advertising device and receiving from the advertising device a confirmation message indicating that the response solution is verified as correct.

The challenge key includes a first message authentication code (MAC) of the advertising device, a second MAC of the field tool, and a fixed value. The fixed value is specific to the field tool and the advertising device.

The operations further include receiving from the advertising device a directed advertising message to a Bluetooth device address (BDA) of the field tool based at least in part on the response solution being verified by the advertising device and pairing to the advertising device based at least in part on receiving the directed advertising message. The advertising device is a battery-powered device (BPD). The operations further include activating a scan mode of the field tool to detect the BLE advertisement message from the advertising device. The operations further include adding the advertising device to a device list. The response solution includes a hash-based message authentication code (HMAC).

Examples described herein also provide a method of field tool pairing of computing devices. The method may include, with a battery-powered device (BPD) and over a Bluetooth low-energy (BLE) network, generating a challenge message. The challenge message includes a challenge key. The method may further include issuing the challenge message in a scannable undirected advertising message and receiving from a field tool a response solution to the challenge message. The response solution may be calculated via a secure hash algorithm (SHA). The method may further include verifying the response solution via the SHA.

The method further includes broadcasting an advertisement of the BPD. The method further includes based at least in part on the response solution being verified, adding the field tool to a device list. The advertisement is broadcast based at least in part on instructions received from a headend device, an indication that communication with the headend device is lost, or combinations thereof. The challenge key includes a first message authentication code (MAC) of the BPD, a second MAC of the field tool, and a fixed value. The fixed value is specific to the field tool and the BPD.

The method further includes sending a confirmation message to the field tool indicating that the response solution is verified as correct, and sending a directed advertising message to a Bluetooth device address (BDA) of the field tool based at least in part on the response solution being verified, the directed advertising message including the BDA of the field tool.

The method further includes receiving a connection request from the field tool based on the directed advertising message sent to the BDA of the field tool, verifying the BDA of the field tool, and based on the verification of the BDA of the field tool, pairing the BPD and the field tool. The response solution includes a hash-based message authentication code (HMAC).

Examples described herein also provide a field tool including a processor, and a non-transitory computer-readable media storing instructions that, when executed by the processor, causes the processor to perform operations. The operations include receiving at the field tool, a challenge message from an advertising device via a Bluetooth low-energy (BLE) advertisement message. The challenge message including a challenge key. The operations further include calculating, based at least in part on the challenge key and a secure hash algorithm (SHA), a response solution, sending the response solution to the advertising device, and receiving from the advertising device a confirmation message indicating that the response solution is verified as correct.

The operations further include receiving from the advertising device a directed advertising message to a Bluetooth device address (BDA) of the field tool based at least in part on the response solution being verified by the advertising device and connecting to the advertising device based at least in part on receiving the directed advertising message. The challenge key includes a first message authentication code (MAC) of the advertising device, a second MAC of the field tool, a fixed value, and the fixed value is specific to the field tool and the advertising device.

Additionally, the techniques described in this disclosure may be performed as a method and/or by a system having non-transitory computer-readable media storing computer-executable instructions that, when executed by one or more processors, performs the techniques described above.

EXAMPLES

Turning now to the figures, FIG. 1 illustrates a system-architecture diagram 100 including one or more other network communication devices, according to an example of the principles described herein. The network communication devices may include a number of Full Function Devices (FFD) 102-1, 102-2, 102-3, 102-4, . . . 102-M, where M is any integer greater than or equal to 1 (collectively referred to as "FFD(s) 102"). Throughout the present description, the FFD(s) may also be referred to as mains-powered device(s) (MPD(s)). The network communication devices may include a number of Limited Function Devices (LFDs) 104-1, 104-2, 104-3, . . . 104-N, where N is any integer greater than or equal to 1 (collectively referred to as "LFDs 104"). Throughout the present description, the LFD(s) may also be referred to as battery-powered device(s) BPD(s). The number of FFD(s) 102 and LFD(s) 104 may be the same number or different numbers. In one example, the network of devices may include a number of LFDs 104 with no FFDs 102. In this example, the LFDs 104 may be communicatively coupled to one another and an area network 106, an edge device 108, a number of network(s) 110, service provider(s) 112, and combinations thereof via a cellular tower. This may create a peer-to-peer and/or a point-to-point (P2P) communications network between the LFDs 104 and other devices described herein.

In one example, the FFDs 102 may include relatively more functionality and/or computing resources than the LFDs 104. In one example, the FFDs 102 may be implemented as mains-powered devices (MPDs) that are connected to mains electricity (e.g., electricity meters), while the LFDs 104 may be implemented as battery-powered devices (BPDs) that are not connected to mains electricity (e.g., water meters, gas meters, control devices, sensor devices, routers, etc. that employ batteries as a power source). However, in other examples, the FFDs 102 and LFDs 104 may have different processing power, processing capabilities, and so on. The techniques described herein may be implemented to communicate between FFDs 102, LFDs 104, and/or any combination of these or other network communication devices.

The network communication devices may further include a field tool 114. The field tool 114 may include any Bluetooth- and/or BLE-enabled device that is capable of connecting to one or more of the LFDs 104. In one example, the field tool 114 may include a BLE radio, a local operations device, a meter reading device, a monitoring device, a diagnostic device, and/or other field-deployed computing devices. In one example, the field tool 114 may include any mobile computing device including, for example, a cell phone, a mobile phone, a smartphone, a personal computer, a laptop computer, a tablet computing device, a personal digital assistant (PDA), and electronic reader device, wearable computing devices such as, for example, smart watches, optical head-mounted displays (OHMDs), and other forms of computing devices. In one example, the field tool 114 may be configured to communicate via Bluetooth and/or BLE communications protocols and technologies with the LFDs 104. Further, in one example, the field tool may be configured to communicate with a number of other devices described in connection with the system-architecture diagram 100 and described herein using any form of wired or wireless communication protocols and technologies. For example, the field tool 114 may communicate with other devices via a cellular communications network.

The field tool 114 may be used to communicatively couple to at least one LFD 104 in order to service the LFD 104; to read, capture, and/or store data collected by the LFD 104; to reboot the LFD 104; to bring the LFD 104 online for the first time or in response to an offline event; to update software and/or firmware of the LFD 104; for confirmation that readings on the LFD 104 are or are not identical to data obtained via the area network 106 and/or network 110; to register the LFD 104 as to the area network 106 and/or network 110; and to confirm proper functionality of the LFD 104, among a myriad of other purposes. Thus, the field tool 114 serves as a diagnostic, management, collection, and/or servicing device (among other functions) as to the LFDs 104. The field tool 114 may be utilized by an individual working in the field (e.g., locations at which the LFDs 104 are located) and seeking to interface with the LFD 104 for any of these or other purposes. Thus, in the examples described herein, the individual operating the field tool 114 may be close enough to the LFD 104 to allow for communications via Bluetooth technologies including BLE to occur. In one example, the communication range of a Bluetooth- and/or BLE-enabled device may be approximately 100 meters (m) (330 feet (ft)) or less.

The network communication devices (e.g., FFDs 102, LFDs 104, field tools 114, etc.) may be in communication with one another via an area network (AN) 106. As used herein, the term "area network" refers to a defined group of devices that are in communication with one another via one or more wired or wireless links. Examples of area networks include, for example, local area networks (LANs), neighborhood area networks (NANs), personal area networks (PANs), home area networks (HANs), Field Area Networks (FANs), or the like. While only one AN 106 is shown in FIG. 1, in practice, multiple ANs 106 may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The area network 106 may utilize any communications standard in communicating between FFDs 102, LFDs 104, and/or the field tool 114. In one example, the area network 106 may utilize cellular communication network technologies. The cellular communication network technologies include, for example; 2G cellular technologies (e.g., global system for mobile communications (GSM), general packet radio service (GPRS), enhanced data rates for GSM evolution (EDGE), evolved EDGE, digital AMPS, code-division multiple access (CDMA) One (cdmaOne), etc.); 3G cellular technologies (e.g., universal mobile telecommunications system (UMTS), wideband-CDMA (W-CDMA), time-division-CDMA (TD-CDMA), time-division synchronous CDMA (TD-SCDMA), CDMA2000, etc.); 4G cellular technologies (e.g., long-term evolution (LTE), worldwide interoperability for microwave access (WiMAX), etc.); and 5G cellular technologies. Further, and of the FFDs 102, LFDs 104, and/or the field tool 114 may utilize any communications standard in communicating with one another. The FFDs 102, LFDs 104, and/or the field tool 114 may utilize Bluetooth wireless communication protocols and technologies including Bluetooth low-energy (BLE) communication protocols and technologies.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In one example, the plurality of channels include radio frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may include a mesh network, in which the network communication devices relay data through the AN 106. Alternatively, or additionally, the area network 106 may include a star network, in which a central device acts a parent to one or more children devices. For example, the FFD 102-M may act as a parent to the LFDs 104-1, 104-2, and 104-3. Further, in one example, the AN 106 may include a portion that is implemented as a mesh network and a portion that is implemented as a star network. Moreover, in one example, the AN 106 may be implemented in whole or part by other types of networks, such as hub-and-spoke networks, mobile networks, cellular networks, etc. In one example, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices (e.g., FFDs 102, LFDs 104, field tools 114, etc.) may communicate by wireless (e.g., radio frequency) and/or wired (e.g., power line communication, Ethernet, serial, etc.) connections.

In one example, the LFDs 104 may be implemented as leaf nodes. A leaf node may generally communicate with a parent node and not relay data for another node. As illustrated in FIG. 1, the LFDs 104-1 and 104-2 act as leaf nodes, with the FFD 102-M being the parent node. However, in one example, the LFDs 104 may relay data for other nodes. For example, the LFD 104-3 may relay data for the LFD 104-N. Further, any type of device may be implemented as a leaf node (e.g., any of the FFDs 102).

The network communication devices also include an edge device 108, which serves as a connection point of the AN 106 to one or more networks 110 (e.g., a backhaul network), such as the Internet. The edge device 108 may include, but is not limited to, a field area router (FAR), a cellular relay, a cellular router, an edge router, a DODAG (Destination Oriented Directed Acyclic Graph) root, a root device or node of the AN, other routing devices, and a combination of the foregoing. In this illustrated example, the edge device 108 may include a FAR, which relays communications from the AN 106 to one or more service providers 112 via the network(s) 110.

In one example, the one or more service providers 112 may include one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. The network communication devices may register or interact with some or all of these one or more central office systems. In one example, the one or more central office systems may implement a meter data management system to collect resource consumption data from the network communication devices (e.g., FFDs 102, LFDs 104, field tools 114, etc.) of the AN 106, process the resource consumption data, provide data regarding resource consumption to customers, utilities, and others, and/or perform a variety of other functionality. In one example, the one or more service providers 112 may include other systems to implement other functionality, such as web services, cloud services, and so on. In one example, the one or more service providers 112 may be implemented as other types of devices, such as in the context of the Internet of Things (IoT) that allows a variety of devices to exchange data.

The one or more service providers 112 may be physically located in a single central location or may be distributed at multiple different locations. The one or more service providers 112 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

In many instances, an LFD may connect to a network by connecting directly with an FFD 102. For example, a battery powered water meter, such as, for example, the LFD 104-1, may discover in its vicinity an electricity meter, the FFD 102-M, connected to mains power. Because the FFD 102-M is connected to mains power, it has no practical energy constraints. The LFD 104-1 may associate the FFD 102-M as its parent, in which case the FFD 102-M acts as the connecting point between the LFD 104-1 and the one or more service providers 112.

In one example, an LFD 104 may connect to a network via an LFD 104 that acts as a relay (an LFD relay). To illustrate, a gas meter, for example, the LFD 104-N, may discover a battery powered water meter, the LFD 104-3, which is already connected to the AN 106 via the FFD 102-M and may play the role of an LFD relay. The LFD 104-N may associate this LFD-relay, the LFD 104-3, as its parent to get connected to the AN 106. In one example, an LFD 104 may connect to other networks and/or connect in other manners.

By way of example and not limitation, network communication devices (e.g., FFDs 102, LFDs 104, field tools 114, etc.) (sometimes referred to as nodes, computing devices, or just devices) may include utility meters (e.g., electricity, water, or gas meters), relays, repeaters, routers, transformers, sensors, switches, encoder/receiver/transmitters (ERTs), appliances, personal computers (e.g., desktop computers, laptop computers, etc.), mobile devices (e.g., smartphones, tablets, personal digital assistants (PDAs), electronic reader devices, etc.), wearable computers (e.g., smart watches, optical head-mounted displays (OHMDs), etc.), servers, access points, portable navigation devices, portable gaming devices, portable media players, televisions, set-top boxes, computer systems in an automobile (e.g., navigation systems), cameras, robots, hologram systems, security systems, home-based computer systems (e.g., intercom systems, home media systems, etc.), projectors, automated teller machines (ATMs), and so on. In some instances, a network communication device may include a battery powered network communication device (also referred to as the "battery powered device" (BPD)) that relies on a battery for power (i.e., is not connected to mains power). In other instances, a network communication device (also referred to as a "mains-powered device" (MPD)) may include a mains-powered device that relies on mains power for electricity.

Example Network Communications Devices

Figure 2:
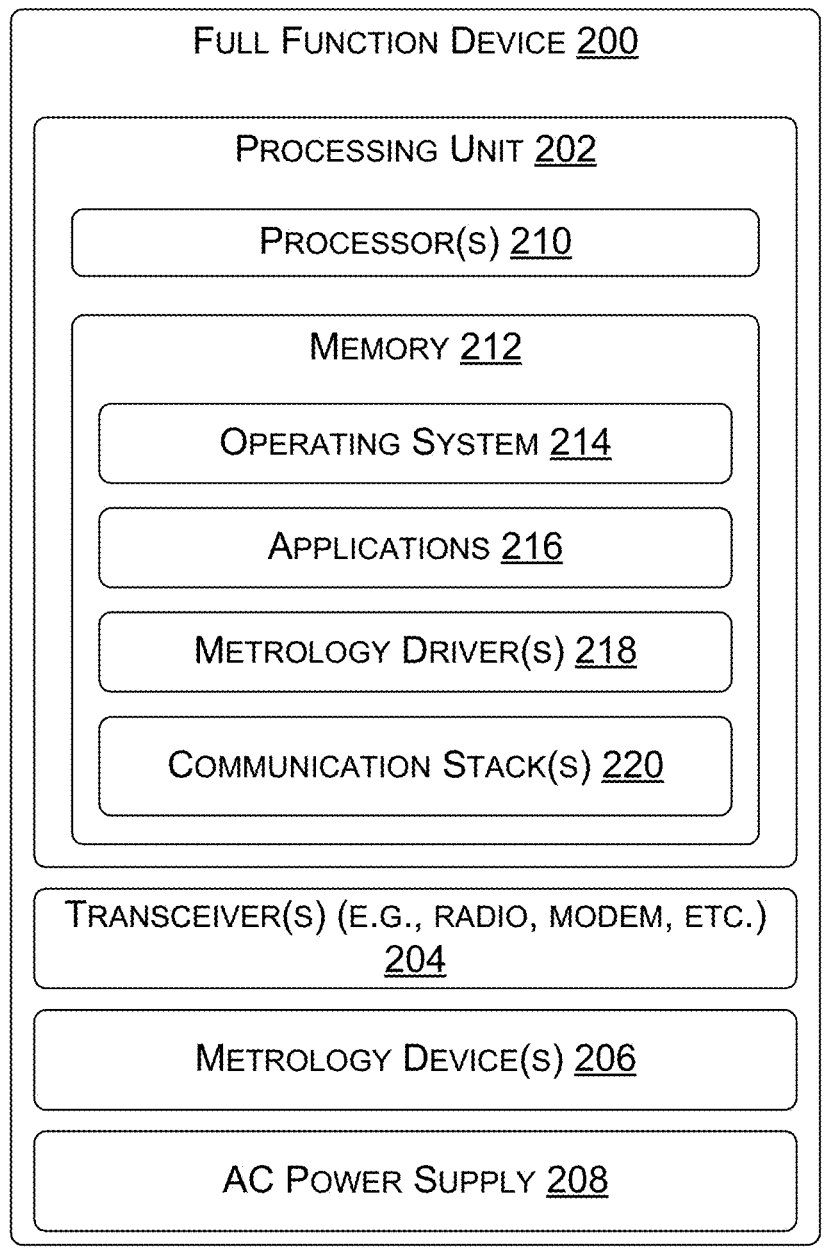
FIG. 2 illustrates a diagram showing details of an example full function device (FFD), according to an example of the principles described herein.

FIG. 2 illustrates a diagram showing details of an example full function device (FFD) 200 (also referred to herein as a mains-powered device (MPD)), according to an example of the principles described herein. The FFD 200 described in connection with FIG. 2 may include any of the FFDs 102 described above in connection with FIG. 1 and the use of element numbers 102 and 200 may be used interchangeably throughout the description. In the example of FIG. 2, the FFD 200 may include a device that is connected to mains power, such as an electricity meter, sensor, etc. However, as discussed above, FFDs can take numerous different forms, depending on the industry and context in which they are deployed. Different types of FFDs may have different physical and/or logical components. For example, utility meter FFDs such as that shown in FIG. 2 may have metrology components, whereas other types of FFDs may not.

As depicted in FIG. 2, the example FFD 200 includes a processing unit 202, a transceiver 204 (e.g., radio), one or more metrology devices 206, and an alternating current (AC) power supply 208 that couples to the AC mains power line wherein the FFD 200 is installed. The processing unit 202 may include one or more processor(s) 210 and memory 212. When present, the processor(s) 210 may include microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver 204 may include one or more hardware and/or software implemented radios to provide two-way RF communication with other network communication devices (e.g., the LFD(s) 104 and/or the field tool 114) in the AN 106 and/or other computing devices via the network 110. In one example, the two-way RF communication may be provided via a Bluetooth standard communication such as BLE communication. The transceiver 204 may additionally or alternatively include a modem to provide power line communication (PLC) communication with other network communication devices that are connected to an electrical service grid.

The metrology device(s) 206 may include the physical hardware and sensors to measure consumption data of a resource (e.g., electricity, water, or gas) at a site of the meter (e.g., the FFD 102). In the case of an electric meter, for example, the metrology device(s) 206 may include one or more Hall effect sensors, shunts, or the like. In the case of water and gas meters, the metrology device(s) 206 may include various flow meters, pressure sensors, or the like. The metrology device(s) 206 may report the consumption data to the one or more service providers 112 via the transceiver 204. The consumption data may be formatted and/or packetized in a manner or protocol for transmission.

The memory 212 may include an operating system (OS) 214 and one or more applications 216 that are executable by the one or more processors 210. The memory 212 may also include one or more metrology drivers 218 configured to receive, interpret, and/or otherwise process the metrology data collected by the metrology device(s) 206. Additionally, or alternatively, one or more of the applications 216 may be configured to receive and/or act on data collected by the metrology device(s) 206. Still further, one or more of the applications 216 may be configured to provide security to advertising packets and reduce or eliminate intentional or unintentional access by a third party, unauthorized device to a BPD (e.g., an LFD 104) as described herein.

The memory 212 may also include one or more communication stacks 220. In some examples, the communication stack(s) 220 may be configured to implement a Bluetooth protocol developed by the Bluetooth SIG, an Institute of Electrical and Electronics Engineers (IEEE) 802.15.1 protocol, a 6LowPAN protocol, an 802.15.4e (TDMA CSM/CA) protocol, an 802.15.4-2015 protocol, other communications protocols, and combinations thereof. However, in other examples, other protocols may be used, depending on the networks with which the device is intended to be compatible. The communication stack(s) 220 describe the functionality and rules governing how the FFD 200 interacts with each of the specified types of networks. For example, the communication stack(s) 220 may cause FFDs 102, 200 and LFDs 104 to operate in ways that minimize the battery consumption of 104 (e.g., FIG. 3, 300) when they are connected to these types of networks. Further, for example, the communication stack(s) 220 may cause FFDs 102, 200 and/or LFDs 104 to operate in ways that minimize the battery consumption during connection with the field tool 114.

In some instances, the FFD 200 may be configured to send or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

Figure 3:
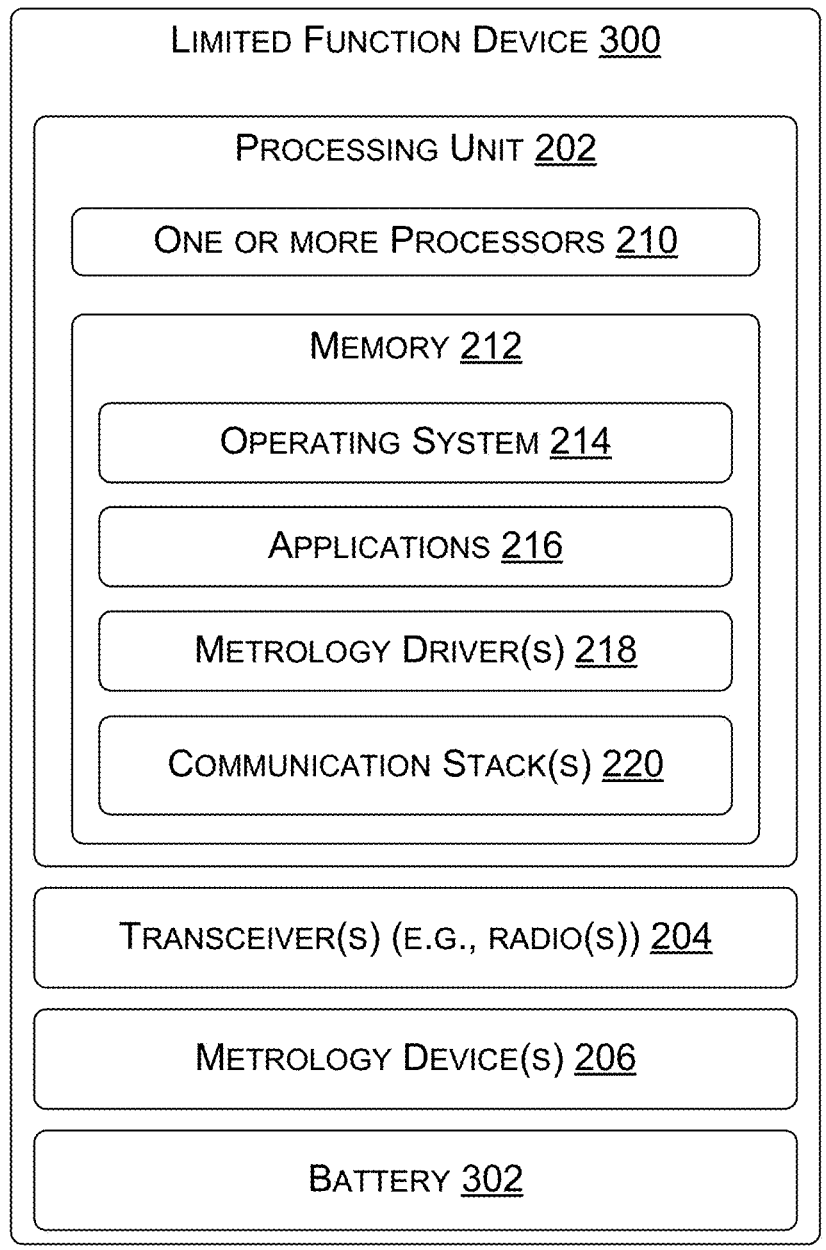
FIG. 3 illustrates a diagram showing details of an example limited function device (LFD) such as a battery-powered device (BPD), according to an example of the principles described herein.

FIG. 3 illustrates a diagram showing details of an example limited function device (LFD) 300 (also referred to herein as a battery-powered device (BPD)), according to an example of the principles described herein. The LFD 300 described in connection with FIG. 3 may include any of the LFDs 104 described above in connection with FIG. 1 and the use of element numbers 104 and 300 may be used interchangeably throughout the description. In the example of FIG. 3, the LFD 300 may include a device that is not connected to mains power. However, as discussed above, LFDs 300 may take numerous different forms, depending on the industry and context in which they are deployed. Different types of LFDs 300 may have different physical and/or logical components. For example, utility meter LFDs such as that shown in FIG. 3 may have metrology components, whereas other types of LFDs may not.

The LFD 300 of FIG. 3 is similar in many respects to the FFD 200 described above in connection with FIG. 2. To the extent that the FFD 200 and LFD 300 include the same or similar components, the functions will not be repeated here. Therefore, the following discussion of the LFD 300 focuses on the differences between the LFD 300 and the FFD 200. However, the differences highlighted below should not be considered to be exhaustive. One difference between the FFD 200 and the LFD 300 is that the LFD 300 may include a battery 302 instead of the AC power supply 208. The specific characteristics of the battery 302 may vary widely depending on the type of LFD 300. By way of example and not limitation, the battery 302 may include a lithium thionyl chloride battery (e.g., a 3 volt battery having an internal impedance rated at 130 Ohms), a lithium manganese battery (e.g., a 3 volt battery having an internal impedance rated at 15 Ohms), a lithium ion battery, a lead-acid battery, and/or an alkaline battery, among other types of batteries.

Further, in one example, even components with similar functions may be different for FFDs 200 than for LFDs 300 due to the different constraints. For example, while both FFDs 200 and LFDs 300 have transceivers, the specific transceivers used may be different. For example, the transceiver of the FFD 200 may include a PLC modem while the transceiver of the LFD 300 may not because the LFD 300 is not connected to an electrical power line that could be used for PLC communications. Additionally, or alternatively, a transceiver of the LFD 300 may employ a lower power RF radio to minimize energy consumption such as described herein in connection with the use of BLE by the LFD 300. Further, other components of FFDs 200 and LFDs 300 may vary. In one example, the LFDs 300 may be implemented with less functionality and/or include less hardware components than the FFDs 200. Further, in one example, components of the LFDs 300 may be lower power components than the corresponding components of the FFDs 200.

The memory 212 of the FFD 200 and LFD 300 is shown to include software functionality configured as one or more "modules" (e.g., the OS 214, the applications 216, the metrology driver(s) 218, and the communication stack(s) 220). However, the modules are intended to represent example divisions of the software for purposes of discussion and are not intended to represent any type of requirement or required method, manner, or necessary organization. Accordingly, while various "modules" are discussed, their functionality and/or similar functionality could be arranged differently (e.g., combined into a fewer number of modules, broken into a larger number of modules, etc.).

Another difference between the FFD 200 and the LFD 300 is that the LFD 300 may include, as part of the applications 216, executable code to perform the functions described herein in connection with providing security to advertising packets sent between the LFD(s) 300 (e.g., BPDs) and the field tool 114, and reducing or eliminating intentional or unintentional access by a third party, unauthorized device. The applications 216 of the LFD 300 (e.g., a BPD) may, via a BLE network, generate a challenge message. The challenge message may include a challenge key. Further, the applications 216 of the LFD 300 may issue the challenge message in a scannable undirected advertising message and may receive, from the field tool 114, a response solution to the challenge message. The response solution may be calculated via a secure hash algorithm (SHA). Further, the applications 216 of the LFD 300 may verify the response solution via the SHA. These functions, among others, are described in more detail herein.

Figure 4:
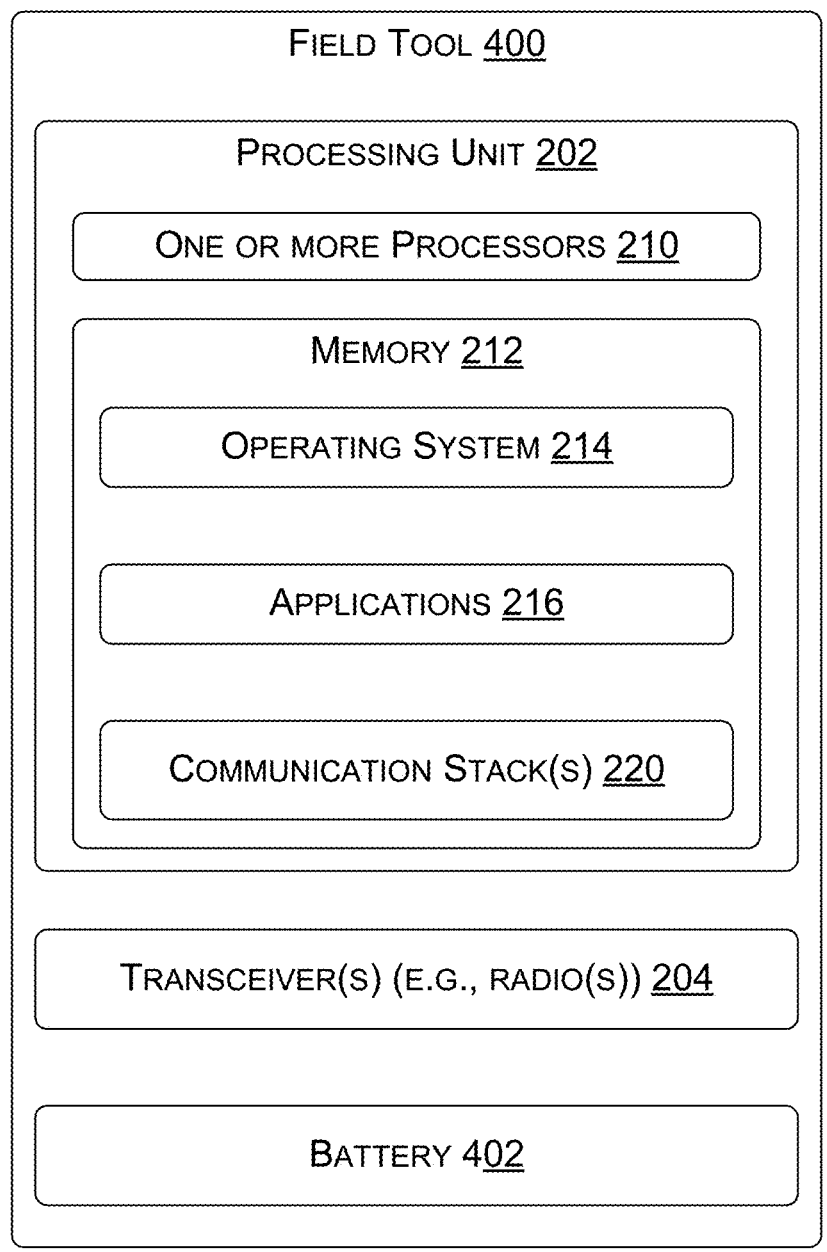
FIG. 4 illustrates a diagram showing details of an example field tool, according to an example of the principles described herein.

FIG. 4 illustrates a diagram showing details of an example field tool 400, according to an example of the principles described herein. The field tool 400 described in connection with FIG. 4 may include the field tool 400 described above in connection with FIG. 1 and the use of element numbers 114 and 400 may be used interchangeably throughout the description. In the example of FIG. 4, the field tool 400 may include a device that is not connected to mains power. However, the field tool 400 may include any Bluetooth- and/or BLE-enabled device that is capable of connecting to one or more of the LFDs 300. Further, as described above, in one example the field tool 400 may include any mobile computing device including, for example, a cell phone, a mobile phone, a smartphone, a personal computer, a laptop computer, a tablet computing device, a personal digital assistant (PDA), an electronic reader device, wearable computing devices such as, for example, smart watches, optical head-mounted displays (OHMDs), and other forms of computing devices. In one example, the field tool 400 may be configured to communicate via Bluetooth and/or BLE communications protocols and technologies with the LFDs 300. The field tool 400 may be used to communicatively couple to at least one LFD 300 in order to service the LFD 300; to read, capture, and/or store data collected by the LFD 300; to reboot the LFD 300; to bring the LFD 300 online for the first time or in response to an offline event; to update software and/or firmware of the LFD 300; for confirmation that readings on the LFD 300 are or are not identical to data obtained via the area network 106 and/or network 110; to register the LFD 300 as to the area network 106 and/or network 110; and/or to confirm proper functionality of the LFD 300, among a myriad of other purposes. The field tool 400 may be utilized by an individual working in the field and seeking to interface with the LFD 300 for any of these purposes.

The field tool 400 of FIG. 4 is similar in many respects to the FFD 200 and/or the LFD 300 described above in connection with FIGS. 2 and 3. To the extent that the field tool 400 and the FFD 200 and LFD 300 include the same or similar components, the functions will not be repeated here. Therefore, the following discussion of the field tool 400 focuses on the differences between the field tool 400 and the FFD 200 and/or LFD 300. However, the differences highlighted below should not be considered to be exhaustive. One difference between the field tool 400 and the FFD 200 is that, like the LFD 300, the field tool 400 may include a battery 402 instead of the AC power supply 208 since the field tool 400 is intended to be used by an individual that is deployed to the field including an area near the LFD 300 where an A/C power supply is not available. However, in one example, the field tool 400 may include an A/C power supply if the field tool 400 were plugged into such a source in the area where the LFD 300 is located. In the example where the power source of the field tool 400 is a battery 402, the specific characteristics of the battery 402 may vary widely depending on the type of field tool 400. By way of example and not limitation, the battery 402 may include a lithium thionyl chloride battery (e.g., a 3 volt battery having an internal impedance rated at 130 Ohms), a lithium manganese battery (e.g., a 3 volt battery having an internal impedance rated at 15 Ohms), a lithium ion battery, a lead-acid battery, and/or an alkaline battery, among other types of batteries.

Further, in one example, even components with similar functions may be different for FFDs 200 and/or LFDs 300 than for the field tool 400 due to the different constraints. For example, while the field tool 400, FFDs 200, and LFDs 300 have transceivers, the specific transceivers used may be different. For example, the transceiver of the FFD 200 may include a PLC modem while the transceiver 204 of the field tool 400 may not because the field tool 400 is not connected to an electrical power line that could be used for PLC communications. Additionally, or alternatively, a transceiver 204 of the field tool 400 may employ a lower power RF radio to minimize energy consumption such as described herein in connection with the use of BLE by the field tool 400 and in a similar manner as described herein in connection with the LFD 300. Further, other components of the field tool 400, the FFDs 200, and LFDs 300 may vary. In one example, the field tool 400 may be implemented with relatively more functionality and/or include more hardware components than the FFDs 200 and/or the LFDs 300. Further, in one example, components of the field tool 400 may be higher power components relative to the corresponding lower power components of the LFDs 300 and/or the corresponding components of the FFDs 200.

The memory 212 of the FFD 200, the LFD 300, and the field tool 400 is shown to include software functionality configured as one or more "modules" (e.g., the OS 214, the applications 216, the metrology driver(s) 218, and the communication stack(s) 220). However, the modules are intended to represent example divisions of the software for purposes of discussion and are not intended to represent any type of requirement or required method, manner, or necessary organization. Accordingly, while various "modules" are discussed, their functionality and/or similar functionality could be arranged differently (e.g., combined into a fewer number of modules, broken into a larger number of modules, etc.).

Another difference between the FFD 200 and the field tool 400 is that the field tool 400 may include, as part of the applications 216, executable code to perform the functions described herein in connection with providing security to advertising packets sent between the LFD(s) 300 (e.g., BPDs) and the field tool 114, and reducing or eliminating intentional or unintentional access by a third party, unauthorized device. The applications 216 of the field tool 400 may, via a BLE network, cause the field tool 400 to receive a challenge message from an advertising device (e.g., an LFD 300) via a BLE advertisement message. The challenge message includes a challenge key. The applications 216 of the field tool 400 may also calculate a response solution based at least in part on the challenge key and a secure hash algorithm (SHA). The field tool 400 may send the response solution to the advertising device. Further, the applications 216 of the field tool 400 may also receive from the advertising device a confirmation message indicating that the response solution is verified as correct. These functions, among others, are described in more detail herein.

Another difference between the field tool 400 and the FFD 200 and the LFD 300 is that the field tool 400 may not include the metrology device(s) 206 and the metrology driver(s) 218 included with the FFD 200 and the LFD 300. Because the field tool 400 is utilized as a diagnostic, management, collection, and/or servicing device (among other functions) as to the LFDs 104, the field tool 400 is not necessarily configured to also perform functions associated with metrology devices 206 and the collection of other types of sensed environmental events.

The various memories 212 described herein in connection with the FFD 200, the LFD 300, and the field tool 400 are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain computing devices (e.g., the FFD 200, the LFD 300, and the field tool 400) are described herein, it should be understood that those computing devices may include other components and/or be arranged differently. As noted above, in one example, a computing device may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing. Further, in some examples a computing device may be implemented as that described in U.S. application Ser. No. 14/796,762, filed Jun. 10, 2015 and titled "Network Discovery by Battery Powered Devices," the entire contents of which are incorporated herein by reference.

Example Advertisement Packet Security Signal Flows and Methods

Figure 5:
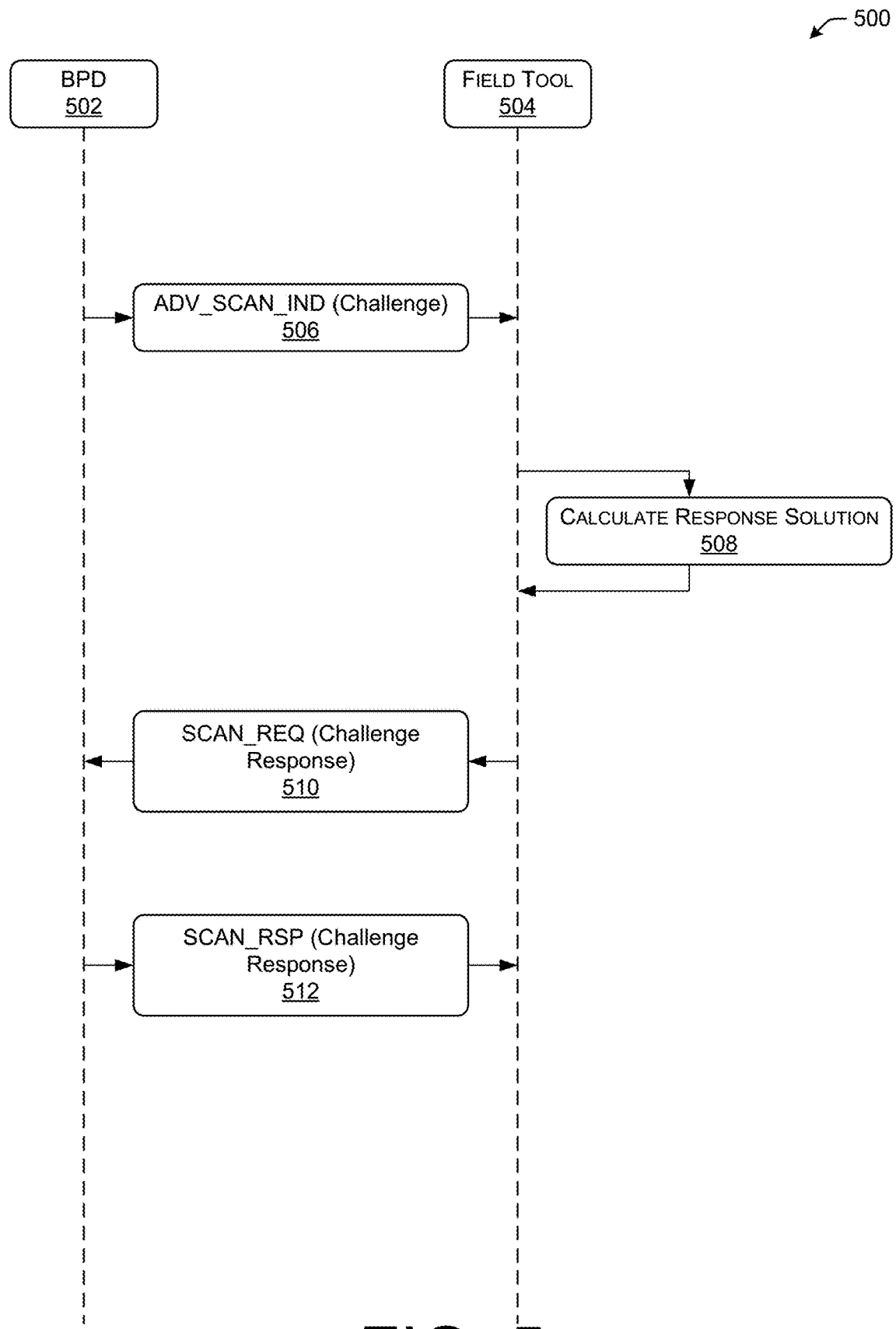
FIG. 5 illustrates a signal flow diagram illustrating an example method of securing an advertising packet in a Bluetooth low-energy (BLE) network from the perspective of the field tool, according to an example of the principles described herein.

Turning again to the figures, FIG. 5 will now be described together with FIG. 8. FIG. 5 illustrates a signal flow diagram illustrating an example method 500 of securing an advertising packet in a Bluetooth low-energy (BLE) network from the perspective of the field tool 114, 400, according to an example of the principles described herein. FIG. 8 illustrates a flow diagram of an example method 800 of securing an advertising packet in a BLE network from the perspective of the field tool 114, 400, according to an example of the principles described herein. In FIGS. 6 and 9 and FIGS. 7 and 10, further details will be provided in connection with the methods and signal flows from the perspective of the LFD(s) 104, 300 and between the field tool 114, 400 and the LFD(s) 104, 300, respectively.

The method 500 of FIG. 5 includes a BPD 502 (e.g., the LFD(s) 104, 300 of FIGS. 1 and 3) that communicates with the field tool 504 (e.g., the field tool 114, 400 of FIGS. 1 and 4). In order to begin a pairing process between the BPD 502 and the field tool 504, a number of messages associated with the advertising of the BPD 502 to other devices including the field tool 504 may be transmitted and responded to. In FIG. 5, the field tool 504 may receive a scannable undirected advertising message (ADV_SCAN_IND) as indicated at 506 which the BPD 502 transmits. In FIG. 8, the field tool 504, at 802, may execute the application(s) 216 to receive a challenge message from an advertising device (e.g., the BPD 502) via a BLE advertisement. The challenge message may be or may be included within the scannable undirected advertising message (ADV_SCAN_IND) 506. The challenge message includes a challenge. The challenge may include a random number generated by the BPD 502 (e.g., the LFD 104).

At 508, the field tool 504 may, based at least in part on the challenge and a secure hash algorithm (SHA), calculate a response solution. Correspondingly, in FIG. 8, the field tool 504, at 804, may execute the application(s) 216 to calculate the response solution based at least in part on the challenge and a secure hash algorithm (SHA). More details regarding the challenge and a challenge key will be provided in connection with the description of FIGS. 7 and 10. As to this example, the challenge key may be algorithmically generated based on hashing information such as the SHA known to both the BPD 502 and the field tool 504. The challenge key may then be used to generate a message authentication code (MAC) over the originally received challenge. Further, in one example, the challenge key may include a fixed value known to the BPD 502 and the field tool 504. In this example, the fixed value may be vendor- and/or manufacturer-specific information so that when the field tool 504 seeks to begin to pair with the BPD 502, both devices can confirm that pairing with the other device is authorized. In one example, the fixed value may include a MAC address of the BPD 502, and a MAC address of the field tool 504, among other data elements.

After obtaining the response solution at 804, the field tool 504 may transmit a scan request (SCAN_REQ) message to the BPD 502 at 510. At 806 of FIG. 8, the response solution may be sent to the advertising device (e.g., the BPD 806). Thus, the response solution may be or may be included within the scan request sent to the BPD 502.

At 512, the field tool 504 may receive a scan response (SCAN_RSP) message from the BPD 502. Correspondingly, at 808 of FIG. 8, the field tool 504 may receive from the advertising device (e.g., the BPD 806) a confirmation message indicating that the response solution is verified as correct. Thus, the confirmation message may be or may be included within the scan response sent by the BPD 502 to the field tool 504. The confirmation message may signal to the field tool 504 that the challenge key and the calculated response solution was correct.

Figure 6:
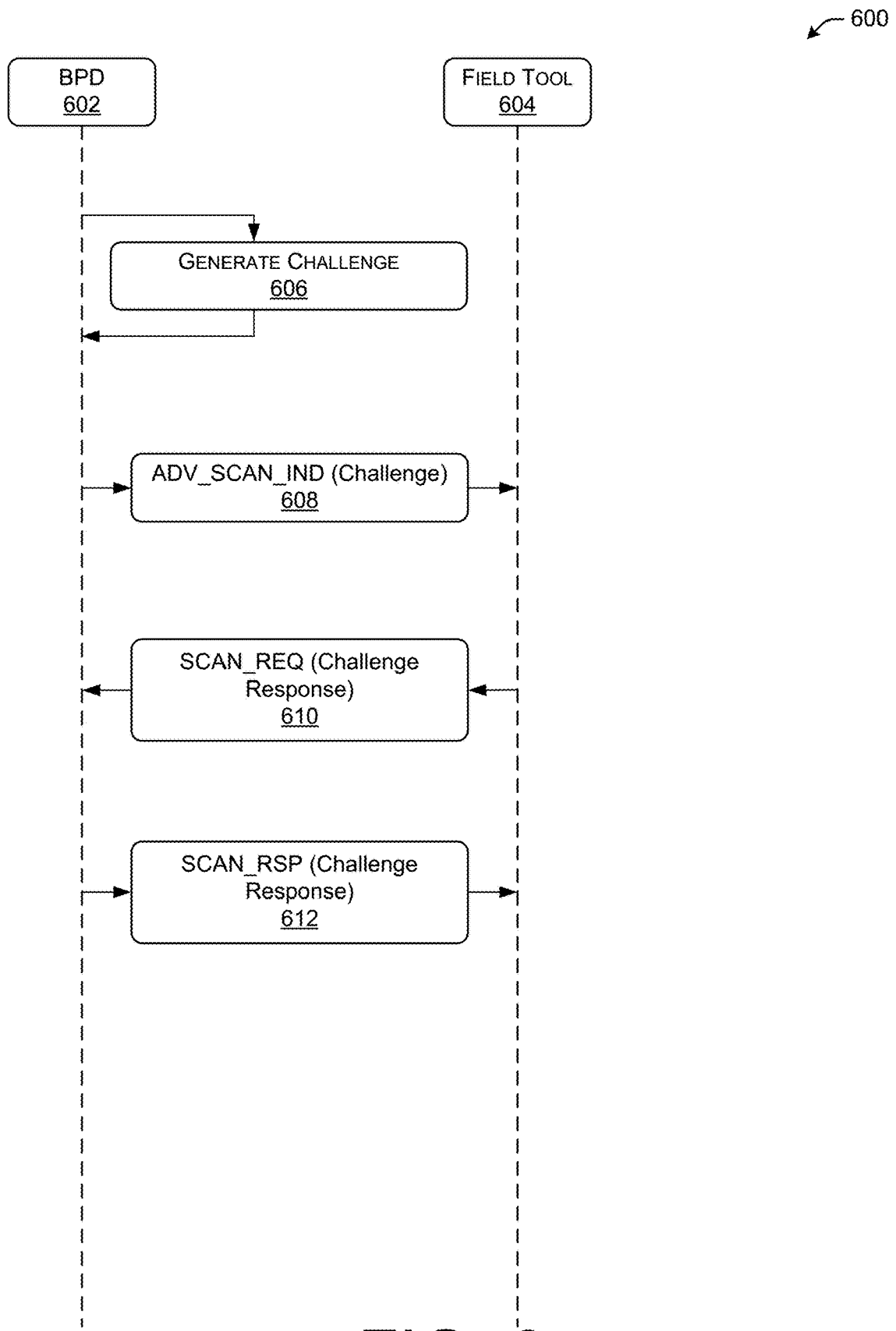
FIG. 6 illustrates a signal flow diagram illustrating an example method of securing an advertising packet in a Bluetooth low-energy (BLE) network from the perspective of the BPD, according to an example of the principles described herein.

To understand FIGS. 6 and 9, it is noted that FIGS. 5 and 8 describe processes associated with providing security to advertising packets from the perspective of the field tool 504 (also referred to herein as 114 and 400). FIGS. 6 and 9 will now be used to describe processes associated with providing security to advertising packets from the perspective of the BPD 602 (also referred to herein as LFD 104 and 300). FIG. 6 illustrates a signal flow diagram of an example method 600 of securing an advertising packet in a BLE network from the perspective of the BPD 602 (also referred to herein as LFD 104, 300, and BPD 502), according to an example of the principles described herein. FIG. 9 illustrates a flow diagram of an example method 900 of securing an advertising packet in a BLE network from the perspective of the BPD 602, according to an example of the principles described herein.

At 606 of FIG. 6, the BPD 602 may generate a challenge. Accordingly, at 902 of FIG. 9, a challenge message may be generated by the BPD 602 over a BLE network through execution of the application(s) 216 of the BPD 602. The challenge generated at 602 may be or may be included within the challenge message generated at 902. Further, the challenge message may include a challenge as part of the challenge. As noted herein, the challenge may include a random number generated by the BPD 502 (e.g., the LFD 104).

At 608 of FIG. 6, the BPD 602 may transmit a scannable undirected advertising (ADV_SCAN_IND) message which the field tool 504 receives. Correspondingly, in FIG. 9 at 904, the application(s) 216 of the BPD 602 may be executed to cause the BPD 602 to issue the challenge message in the scannable undirected advertising message. Thus, a challenge to the field tool 604 may be issued by BPD 602.

At 610 of FIG. 6, the BPD 602 may receive a scan request (SCAN_REQ) message from the field tool 604. Similarly, at 906 of FIG. 9, the BPD 602 may receive from the field tool 604 a response solution to the challenge message. As described above, the response solution may be calculated via a keyed SHA such as an hash-based authentication code (HMAC) as described in more detail below. Thus, the response solution or challenge response may be or may be included within the scan request received by the BPD 502.

At 612 of FIG. 6, the BPD 602 may transmit a scan response (SCAN_RESP) message to the field tool 604. Correspondingly, at 908 of FIG. 9, the response solution may be verified via the SHA by sending to the field tool 604 a confirmation message indicating that the response solution is verified as correct. Thus, the confirmation message may be or may be included within the scan response sent by the BPD 602 to the field tool 604. The confirmation message may signal to the field tool 604 that the challenge key and the calculated response solution was correct.

Having described the processes and methods of providing security to advertising packets from the perspective of the BPD 602 (also referred to herein as 104, 300, and 502 in FIGS. 1, 3, and 5, respectively) and from the perspective of the field tool 604 (also referred to herein as 114, 400, and 604 in FIGS. 1, 4, and 6, respectively), more details regarding the processes and methods of providing security to advertising packets will now be described in connection with FIGS. 7 and 10. However, FIG. 7 will be described separately from FIG. 10.

Figure 7:
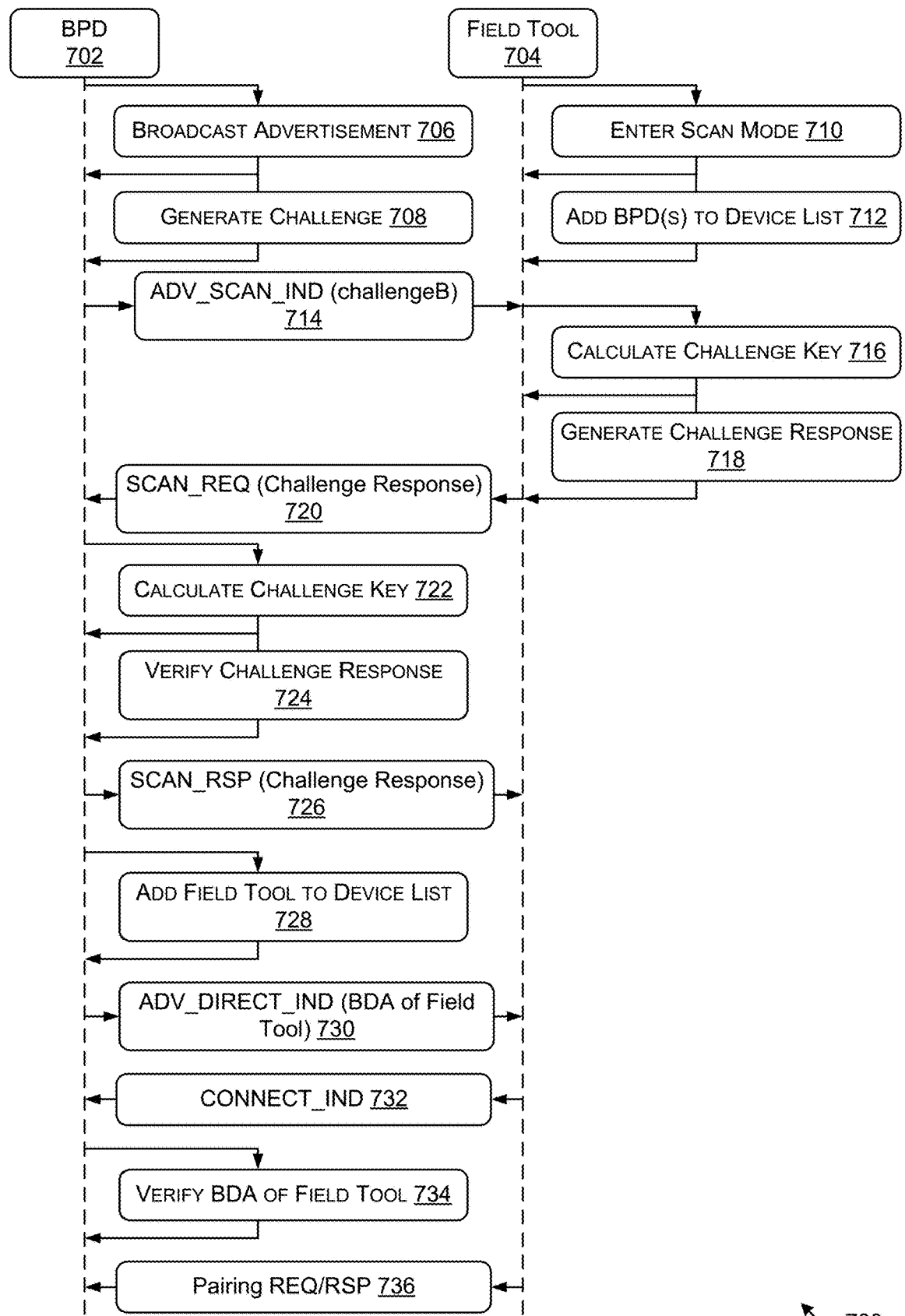
FIG. 7 illustrates a signal flow diagram illustrating an example method of securing an advertising packet in a Bluetooth low-energy (BLE) network, according to an example of the principles described herein.
Figure 8:
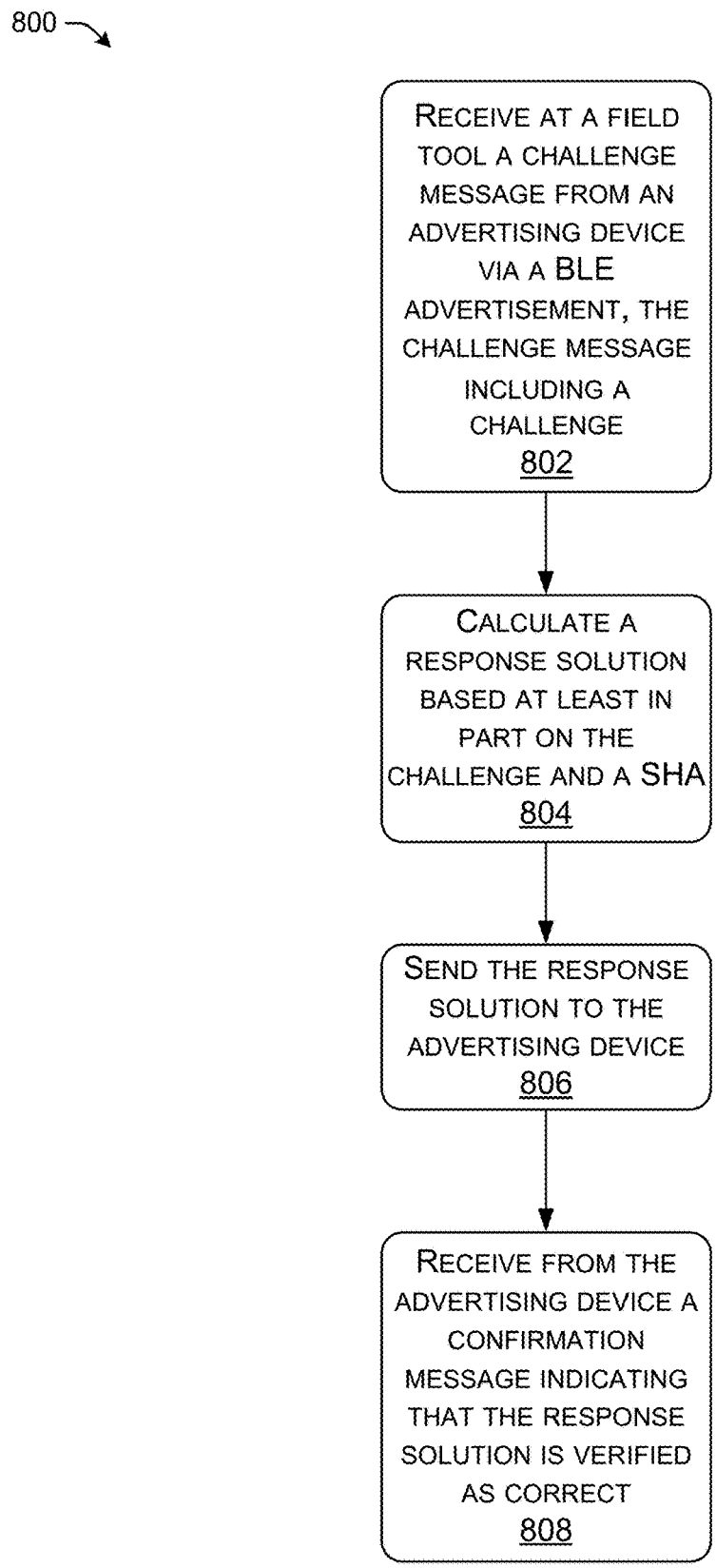
FIG. 8 illustrates a flow diagram of an example method of securing an advertising packet in a BLE network from the perspective of the field tool, according to an example of the principles described herein.

FIG. 7 illustrates a signal flow diagram 700 of securing an advertising packet in a Bluetooth low-energy (BLE) network, according to an example of the principles described herein. The signal flow of FIG. 7, at 706 and at the BPD 702 (also referred to herein as 104, 300, 502, and 602), may include enabling advertisement of the BPD 702 by beginning broadcasting of messages from the BPD 702. The BPD 702 may begin with advertising before accepting a connection through a pairing process, and advertisement packets sent by the BPD 702 may be a primary method of allowing another BLE-enabled device such as the field tool 704 to discover the BPD 702. Further, in practice, a BLE connection is first established as described herein prior to commencing the pairing process. The difference between two BLE devices (e.g., the BPD 702 and the field tool 704) being in a connected mode (e.g., paired) versus in an advertising-discovery mode is that the connected mode allows bi-directional data transfer between the two connected devices. Thus, enabling and broadcasting advertisements as indicated at 706 allows the BPD 702 to begin communications with the field tool 704 prior to entering into a connected or paired mode with the field tool 704.

In one example, the BPD 702 may enable advertisement mode and broadcast an advertisement if and when instructed via a primary communications mechanism such as via a cellular communications mechanism from a headend device, or if the BPD 702 were to be out of communication with the headend device via the primary communications channel for a predefined period. The headend device may include any FFD 102, an edge device 108, the service providers 112, other controlling devices, and combinations thereof. Further, the headend device may include, for example, the OpenWay operations center (OWOC) performance manager or the advanced metering manager (AMM) operations manager developed and distributed by Itron, Inc. In this manner, the BPD 702 may conserve battery power and remain in a non-advertising state until directed to enter the advertisement state. In one example, the user of the field tool 704 or other individual may instruct the headend device to, in turn, instruct the BPD 702 to enter the advertisement mode. Further, in one example where the BPD 702 is out of communication with the headend device via the primary communications channel for the predefined period, this may be a reason as to why the field tool 704 is deployed by an individual into the field in order to assess any issues with the BPD 702 and its inability to communicate via the primary communications channel. In this manner, the BPD 702 may enable and broadcast advertisements when necessary in order to begin pairing and communication with the field tool 704. Further, in one example, the field tool 704 and/or an individual using the field tool 704, as mentioned above, may be made aware of the BPD 702 having been enabled to advertise through the same or similar means including information or instructions received from the headend device.

In a similar manner as described above in connection with 706, the field tool 704 may enter a scan mode at 710 where the field tool 704 may begin to scan for any advertisements from BLE-enabled devices such as the BPD 702. In a similar manner as the BPD 702 enabling advertisement at 706, in one example, the field tool 704 may enter the scan mode and begin listening for or detecting an advertisement if and when instructed via a primary communications mechanism such as via a cellular communications mechanism from a headend device and/or when the field tool 704 enters BLE communication range with a BPD 702 that is out of communication with the headend device via the primary communications channel for a predefined period. In either of these scenarios, the field tool 704 is able to scan and detect an advertisement transmitted by the BPD 706. Further, in one example, the field tool 704 and/or an individual using the field tool 704, as mentioned above, may be made aware of the BPD 702 having been enabled to advertise through the same or similar means including information or instructions received from the headend device.

At 708, the BPD 702 may generate a challenge to present to a scanning device such as the field tool 704. In one example, the challenge may include a randomly-generated challenge. The challenge generated at 708 may be transmitted by the BPD 702 via a scannable undirected advertising message (ADV_SCAN_IND) at 714. As noted, the advertising message is undirected so that any BLE-enabled device may be able to scan for and detect the advertising message from the BPD 702. Because any BLE-enabled device may be able to scan for and detect the advertising message, a third party, unauthorized device other than the field tool 704 may also scan for and detect the advertising message. This third party, unauthorized device may be acting intentionally (e.g., nefariously) or unintentionally, and although the present systems and methods preclude the third party, unauthorized device from connecting with the BPD 702, the third party, unauthorized device may still be able to conduct a DoS attack on the BPD 702 by draining the life of the battery 302 of the BPD 702. Thus, as will be described below in more detail, the BPD 702 may create whitelists and/or blacklists authorizing or denying certain devices from communicating with the BPD 702.

Turning again to FIG. 7, at 712, the field tool 704 may create a device list by adding the BPD 702 to the device list. The device list may include any number of devices to which the field tool 704 may connect to including any number of BPDs 702 including, for example, the LFDs 104 depicted in FIG. 1 as well as any other BPD 702 in that network or other networks. In the examples described herein, a device list may include a whitelist and/or a blacklist. A whitelist may be any access control mechanism that denies access of all devices except those explicitly identified in the whitelist. Similarly, a blacklist may be any access control mechanism that allows through all elements except those explicitly identified in the blacklist. The whitelist and/or blacklist may be stored in memory (e.g., memory 212 of the field tool) accessible by the field tool 704.

At 714, the BPD 702 may transmit the scannable undirected advertising message (ADV_SCAN_IND) to the field tool 704. The scannable undirected advertising message may include a challenge (e.g., "challengeB" as indicated in FIG. 7). The challenge generated at 708 may include any advertising packet that includes, for example, a header, a preamble, an address, a protocol data unit (PDU), and other fields that may be included within the advertising packet. In one example, the challenge may be included as a payload of the PDU.

The scannable undirected advertising message (ADV_SCAN_IND) may include a challenge. The challenge may include at least one fixed value that is known by the BPD 702 and the field tool 704 but is unknown to other devices such as a third party, unauthorized device. In one example, this fixed value may include vendor- and/or manufacturer-specific information so that when the field tool 504 seeks to begin to pair with the BPD 502, both devices can confirm that pairing with the other device is authorized. In one example, the key may take the following form:

Key=SHA256 (SHA256 (macB∥macF∥0xFixed Value)

where "SHA256" refers to a type of secure hash algorithm 2 (SHA-2). SHA-2 is a set of cryptographic hash functions. SHA-256 is a hash function computed with eight 32-bit words (e.g., 256 bits). The macB refers to the message authentication code (MAC) of the BPD 702, and macF refers to the MAC of the field tool 704. A MAC may be any piece of information used to authenticate a message. The MAC confirms that a message came from the stated sender (e.g., is authentic) and has not been changed. The MAC value protects the data integrity of the message as well as its authenticity by allowing verifiers (who also possess the secret key) to detect any changes to the message content. Thus, the BPD 702 and the field tool 704 may, via the use of macB and macF, verify that messages sent between them are authentic and unaltered. The above-described SHA is an example algorithm to generate the challenge key. In the examples described herein, the challenge key is based on any algorithm as long as the algorithm is known to both the BPD 702 and the field tool 704. Thus, the challenge key may include a key generation algorithm and any number of key generation input parameters.

The challenge key may further include a fixed value as indicated by "0xFixed Value." As mentioned above, the fixed value may include vendor- and/or manufacturer-specific information so that when the field tool 704 seeks to begin to pair with the BPD 702, both devices can confirm that pairing with the other device is authorized. The fixed value may be provided to the BPD 702 during manufacturing and installation of any software and/or firmware and may be included as code or within a look-up table stored on memory 212 of the BPD 702. Similarly, the fixed value may be provided to the field tool 704 as it receives this information from the vendor and/or manufacturer or some other source and may store the fixed value in the memory 212 of the field tool 704 as code or within a look-up table stored on memory 212. In one example, the fixed value may be proprietary such that only the BPD 702 and the field tool 704 know the fixed value.

The field tool 704 may calculate the challenge key at 716. The challenge key may include at least one fixed value known to the BPD 602 and the field tool 604. Calculation of the challenge key may include the field tool 704 executing a secure hash algorithm (SHA). In one example, the SHA may be known by the BPD 702 and the field tool 704 but is unknown to other devices such as a third party, unauthorized device as the means by which the challenge key may be calculated by both the BPD 702 and the field tool 704. The SHA may be, for example, the SHA-256 and may be used to output a hash-based authentication code (HMAC) value. A HMAC is a type of MAC that includes a cryptographic hash function and a secret cryptographic key. As with a MAC, an HMAC may be used to simultaneously verify both the data integrity and the authenticity of a message.

Further, the HMAC may provide message authentication using a shared secret between the BPD 702 and the field tool 704 where the shared secret is algorithmically derived and a shared fixed value may be known between the BPDs 702 within the network (e.g., a mesh network). This is instead of using digital signatures with asymmetric cryptography. Use of an HMAC trades off the need for a complex public key infrastructure by delegating the key exchange to the communicating parties who are responsible for establishing and using a trusted channel to agree on the key prior to communication such as described herein in connection with the BPD 702 and the field tool 704 and their obtaining of the fixed value prior to their communications. A cryptographic hash function, such as SHA-2 (e.g., SHA-256) may be used in the calculation of the HMAC value. The resulting MAC algorithm may be referred to as HMAC-X, where X is the hash function used (e.g. HMAC-SHA256). The cryptographic strength of the HMAC may depend upon the cryptographic strength of the underlying hash function, the size of its hash output, and the size and quality of the key. HMAC uses two passes of hash computation. The secret key may first be used to derive two keys; an inner key and an outer key. The first pass of the algorithm produces an internal hash derived from the message and the inner key. The second pass produces the final HMAC code derived from the inner hash result and the outer key. Thus, the algorithm provides better immunity against length extension attacks. An iterative hash function breaks up a message into blocks of a fixed size and iterates over them with a compression function. For example, SHA-256 operates on 256-bit blocks. The size of the output of HMAC is the same as that of the underlying hash function (e.g., 256 in the case of SHA-256), although it can be truncated if necessary. HMAC does not encrypt the message. Instead, the message (encrypted or not) may be sent alongside the HMAC hash. The BPD 702 and the field tool 704 with the secret key (e.g., the fixed value) will hash the message again themselves, and if it is authentic, the received and computed hashes will match as performed in connection with 716 through 726 where both the BPD 702 and the field tool 704 calculate the challenge key. The definition for the HMAC may be as follows:

$$HMAC(K, m) = H((K' \oplus opad) \| H((K' \oplus ipad) \| m))$$

$$K' = \begin{cases} H(K) & K \text{ is larger than block size} \\ K & \text{otherwise} \end{cases}$$

where:
H is a cryptographic hash function
m is the message to be authenticated
K is the secret key
K' is a block-sized key derived from the secret key, K; either by padding to the right with 0s up to the block size, or by hashing down to less than or equal to the block size first and then padding to the right with zeros
∥ denotes concatenation
⊕ denotes bitwise exclusive or (XOR)
opad is the block-sized outer padding, consisting of repeated bytes valued 0x 5c
ipad is the block-sized inner padding, consisting of repeated bytes valued 0x 36

Once the challenge key has been calculated, at 718 the field tool 704 may generate a challenge response. The challenge response from the field tool 704 may include the HMAC in the form of, for example, HMAC(K, challengeB). The challenge response may be sent to the BPD 702 via a scan request (SCAN_REQ) at 720. The BPD 702 may calculate the challenge key at 722 in a manner similar to how the field tool 704 does so at 716. When the HMAC value is obtained at 722, the BPD 702 may verify the challenge response at 724. In order to inform the field tool 704 of the verification of the challenge response, the BPD 702 may transmit a scan response (SCAN_RSP) message at 726 to the field tool 704.

At 728, the BPD 702 may add the field tool 704 to a device list created by the BPD 702. Like the device list created at 712, the device list created by the BPD 702 may include any number of devices to which the BPD 702 may connect to including the field tool 704. The device list (e.g., a whitelist and/or blacklist) may be stored in memory (e.g., memory 212 of the BPD 702) accessible by the BPD 702.

As the BPD 702 and the field tool 704 communicate with one another, the two devices may be made aware of one another's Bluetooth device addresses (BDA). A connectable directed advertising (ADV_DIRECT_IND) message may be transmitted from the BPD 702 to the field tool 704 at 730. The connectable directed advertising message may include the BDA of the field tool 704 in order to directly address the connectable directed advertising message to the field tool 704. The field tool 704 may reply with a connection request (CONNECT_IND) message at 732. The BPD 702 may verify, at 734, the BDA of the field tool 704 to ensure that the connection request message received at 732 was, in fact, sent by the field tool 704.

Once verification at 734 has been completed, a set of pairing requests and responses may, at 736, be sent between the BPD 702 and the field tool 704 in order to begin the pairing process. In this manner, the security of advertising packets may be achieved in a BLE network.

Figure 10:
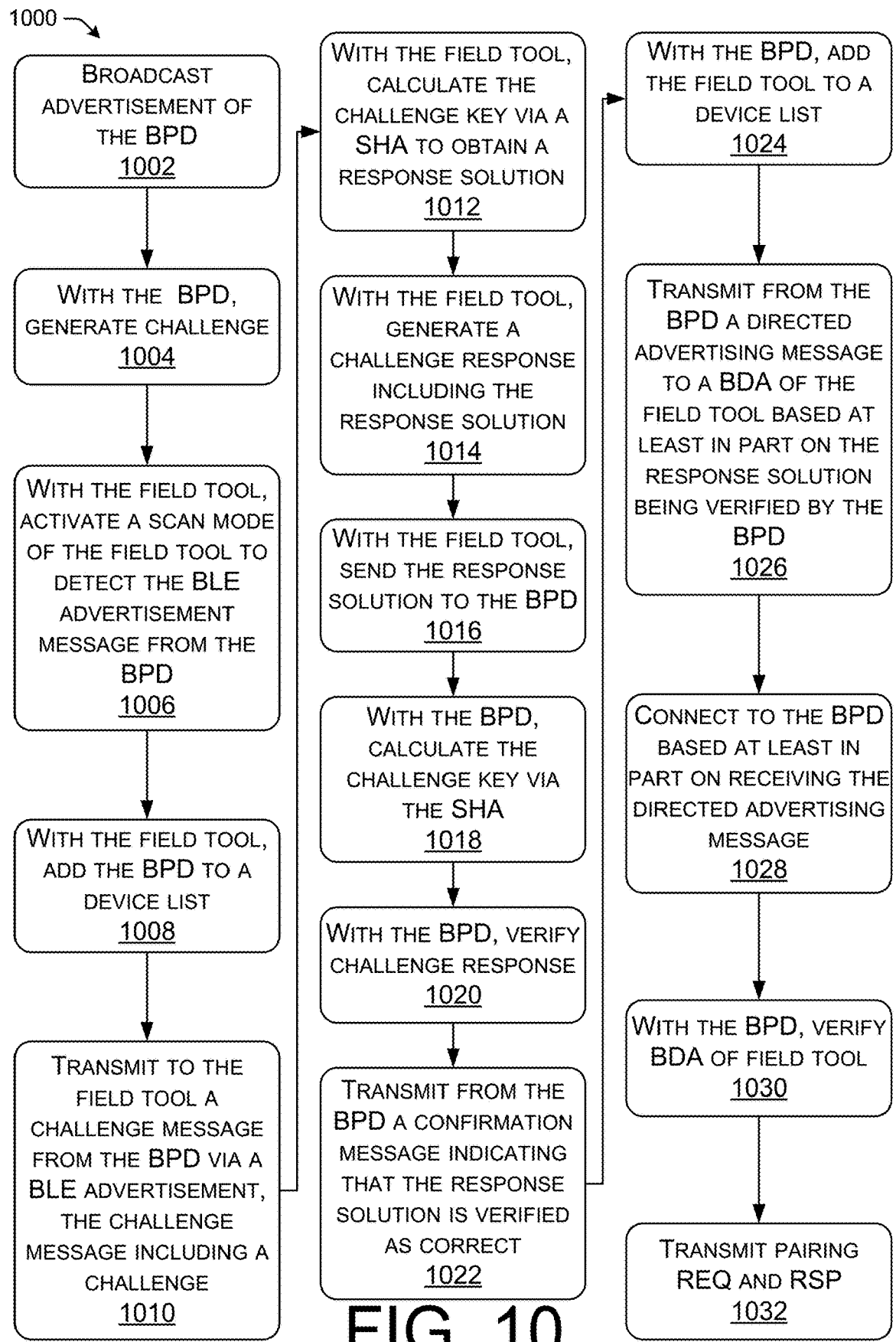
FIG. 10 illustrates a flow diagram of an example method of securing an advertising packet in a BLE network, according to an example of the principles described herein.

FIG. 10 illustrates a flow diagram of an example method 1000 of securing an advertising packet in a BLE network, according to an example of the principles described herein. The method 1000 may include, at 1002, enabling advertisement of the BPD 702 by beginning broadcasting of messages from the BPD 702, and at 1004, generating a challenge with the BDP 702.

At 1006, the method 1000 may also include, with the field tool 704, activating a scan mode of the field tool 704 to detect the BLE advertisement message from the BPD 702. The field tool 704 may add the BPD 702 to a device list at 1008. The method 1000 may also include, at 1010, transmitting to the field tool 704 a challenge message from the BPD 702 via a BLE advertisement. As described above, the challenge message may include a challenge. The field tool 704 may, at 1012, calculate the challenge key via a SHA, at 1014, generate a challenge response including a response solution, and, at 1016, send the challenge response including the response solution to the BPD 702.

At 1018, the method 1000 may also include, with the BPD 702, calculating the challenge key via the SHA, and, at 1020, verifying the challenge response. The BPD 702 may transmit at 1022 a confirmation message to the field tool 704 indicating that the response solution is verified as correct. The BPD 702 may also add the field tool to a device list at 1024.

The BPD 702 may, at 1026, transmit a directed advertising message to a BDA of the field tool 704 based at least in part on the response solution being verified by the BPD 702. In one example, the directed advertising message may include the BDA of the field tool 704. The field tool 704 may transmit the BDA of the field tool 704 along with the directed advertising message to allow the field tool 704 to confirm that the directed advertising message is being transmitted by the BPD 702.

At 1028, the field tool 704 may connect to the BPD 702 based at least in part on receiving the directed advertising message by transmitting a connection request to the BPD 702. The BPD 702 may verify the BDA of the field tool 704 at 1030. Having completed the field tool connection request process described above in connection with securing advertising packets sent between the BPD 702 and the field tool 704, the BPD 702 and the field tool 704 may then transmit pairing request and response messages at 1032 to pair the BLE devices (e.g., the BPD 702 and the field tool 704).

CONCLUSION

The examples described herein provide for the preventing a third party, unauthorized device from connecting to a battery-powered device, and, instead, securely connecting to a field tool by using a challenge/response call in the advertising packet. This will provide an opportunity to limit connections to only those devices with knowledge of vendor- and/or manufacturer-specific key generation algorithms. The above systems and methods preserve battery life of the BPD (e.g., the LFD) due to a reduction in connection attempts made by potentially nefarious and even unintentional third party, unauthorized devices. Further, the present systems and methods may add an extra layer of security before the application layer of the BLE connection process. Because of the present systems and methods, the transmission windows for advertising packets will be able to be controlled by the headend or as a failsafe if the device cannot register on the network. This will further preserve battery life of the BPD. The present systems and methods eliminate unauthorized attempts of spoofing the challenge response, and whitelists and/or blacklists devices to increase security and preserve battery life.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A non-transitory computer-readable medium storing instructions that, when executed, cause a processor to perform operations, comprising:
    generating, by a metrology device, a challenge message, the challenge message including a challenge key;
    issuing, by the metrology device and via a network, the challenge message in a scannable undirected advertising message;
    receiving, by the metrology device and from a field tool, a response solution to the challenge message, the response solution being calculated based at least in part on the challenge key; and
    verifying, by the metrology device, the response solution based at least in part on a secure hash algorithm (SHA),
    wherein the metrology device calculates the challenge key using the SHA based at least in part on inputs known to the metrology device and the field tool, the challenge key further including a fixed value provided to the metrology device during manufacturing of the metrology device by a manufacturer, and
    wherein the fixed value is specific to the manufacturer of the metrology device and known to the field tool and the metrology device.

2. The non-transitory computer-readable medium of claim 1, wherein the metrology device communicates with the field tool over a Bluetooth low-energy (BLE) network.

3. The non-transitory computer-readable medium of claim 1, the operations further comprising broadcasting an advertisement of the metrology device.

4. The non-transitory computer-readable medium of claim 3, the operations further comprising based at least in part on the response solution being verified, adding the field tool to a device list stored in memory accessible by the metrology device.

5. The non-transitory computer-readable medium of claim 3, wherein the advertisement is broadcast based at least in part on instructions received from a headend device, an indication that communication with the headend device is lost, or combinations thereof.

6. The non-transitory computer-readable medium of claim 1, further comprising:
    sending a confirmation message to the field tool indicating that the response solution is verified as correct; and
    sending a directed advertising message to a Bluetooth device address (BDA) of the field tool based at least in part on the response solution being verified, the directed advertising message including a BDA of the metrology device.

7. The non-transitory computer-readable medium of claim 6, further comprising:
    receiving a connection request from the field tool based on the directed advertising message sent to the BDA of the field tool;
    verifying the BDA of the field tool; and
    based on the verifying of the BDA of the field tool, pairing the metrology device and the field tool.

8. The non-transitory computer-readable medium of claim 1, wherein the response solution includes a hash-based message authentication code (HMAC).

9. The non-transitory computer-readable medium of claim 1, wherein the fixed value is provided to the metrology device during manufacturing by installation of software or firmware.

10. The non-transitory computer-readable medium of claim 9, wherein the fixed value is included as code or within a lookup-table stored in memory of the metrology device.

11. A metrology device comprising:
    a processor; and
    a non-transitory computer-readable medium storing instructions that, when executed by the processor, cause the processor to perform operations comprising:
        generating a challenge message, the challenge message including a challenge key;
        issuing the challenge message in a scannable undirected advertising message;
        receiving from a field tool a response solution to the challenge message, the response solution being calculated based at least in part on the challenge key; and
        verifying the response solution based at least in part on a secure hash algorithm (SHA),
        wherein the metrology device calculates the challenge key using the SHA based at least in part on inputs known to the metrology device and the field tool, the challenge key further including a fixed value provided to the metrology device during manufacturing of the metrology device by a manufacturer, and
        wherein the fixed value is specific to the manufacturer of the metrology device and known to the field tool and the metrology device.

12. The metrology device of claim 11, wherein the metrology device communicates with the field tool over a Bluetooth low-energy (BLE) network.

13. The metrology device of claim 11, the operations further comprising broadcasting an advertisement of the metrology device.

14. The metrology device of claim 13, the operations further comprising based at least in part on the response solution being verified, adding the field tool to a device list stored in memory accessible by the metrology device.

15. The metrology device of claim 13, wherein the advertisement is broadcast based at least in part on instructions received from a headend device, an indication that communication with the headend device is lost, or combinations thereof.

16. The metrology device of claim 11, further comprising:
    sending a confirmation message to the field tool indicating that the response solution is verified as correct; and
    sending a directed advertising message to a Bluetooth device address (BDA) of the field tool based at least in part on the response solution being verified, the directed advertising message including a BDA of the metrology device.

17. The metrology device of claim 16, further comprising:
    receiving a connection request from the field tool based on the directed advertising message sent to the BDA of the field tool;

verifying the BDA of the field tool; and
based on the verifying of the BDA of the field tool, pairing the metrology device and the field tool.

18. The metrology device of claim 11, wherein the response solution includes a hash-based message authentication code (HMAC).

19. The metrology device of claim 11, wherein the metrology device is a battery-powered device (BPD).

20. The metrology device of claim 11, wherein the fixed value is provided to the metrology device during manufacturing by installation of software or firmware.

21. A method comprising:
generating, by a metrology device, a challenge message, the challenge message including a challenge key;
issuing, by the metrology device and via a network, the challenge message in a scannable undirected advertising message;
receiving, by the metrology device and from a field tool, a response solution to the challenge message, the response solution being calculated based at least in part on the challenge key; and
verifying, by the metrology device, the response solution based at least in part on a secure hash algorithm (SHA),
wherein the metrology device calculates the challenge key using the SHA based at least in part on inputs known to the metrology device and the field tool, the challenge key further including a fixed value provided to the metrology device during manufacturing of the metrology device by a manufacturer, and
wherein the fixed value is specific to the manufacturer of the metrology device and known to the field tool and the metrology device.

22. The method of claim 21, wherein the fixed value is provided to the metrology device during manufacturing by installation of software or firmware.

23. The method of claim 21, further comprising:
broadcasting an advertisement of the metrology device; and
based at least in part on the response solution being verified, adding the field tool to a device list stored in memory accessible by the metrology device,
wherein the advertisement is broadcast based at least in part on instructions received from a headend device, an indication that communication with the headend device is lost, or combinations thereof.

24. The method of claim 21, further comprising:
sending a confirmation message to the field tool indicating that the response solution is verified as correct; and
sending a directed advertising message to a Bluetooth device address (BDA) of the field tool based at least in part on the response solution being verified, the directed advertising message including a BDA of the metrology device;
receiving a connection request from the field tool based on the directed advertising message sent to the BDA of the field tool;
verifying the BDA of the field tool; and
based on the verifying of the BDA of the field tool, pairing the metrology device and the field tool.

25. The method of claim 21, wherein:
the response solution includes a hash-based message authentication code (HMAC), and
the metrology device is a battery-powered device (BPD).

* * * * *